Nov. 18, 1958   W. L. ALLSUP ET AL   2,860,566
PROTECTING DEVICE FOR VEHICLE OPERATORS
Filed June 3, 1957   2 Sheets-Sheet 1

Walter L. Allsup
Thad M. McSwain
INVENTORS

Walter L. Allsup
Thad M. McSwain
INVENTORS

United States Patent Office 2,860,566
Patented Nov. 18, 1958

2,860,566
PROTECTING DEVICE FOR VEHICLE OPERATORS

Walter L. Allsup and Thad M. McSwain, Stuttgart, Ark.

Application June 3, 1957, Serial No. 663,099

1 Claim. (Cl. 98—1)

Our invention relates to improvements in devices for protecting the operators of agricultural machines such as tractors, combines and the like from the weather and insects and dust and also for keeping such operators cool in hot weather.

The primary object of our invention is to provide for the above purposes a combined umbrella, or canopy, and a motor driven fan in the umbrella, or canopy mounted and arranged for taking in air from a substantial distance above the center of the umbrella canopy where it is comparatively free from dust and blowing such clean air downwardly around the operator while seated in a manner to keep the operator cool and free from dust, chaff and the like, the motor and fan being a unit removable and replaceable as such and the umbrella or canopy being especially designed for directing air from the fan down over and around the operator.

Another object is to provide a combined umbrella, or canopy, and motor driven fan and means for mounting the same on the operator's seat all of inexpensive practical construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
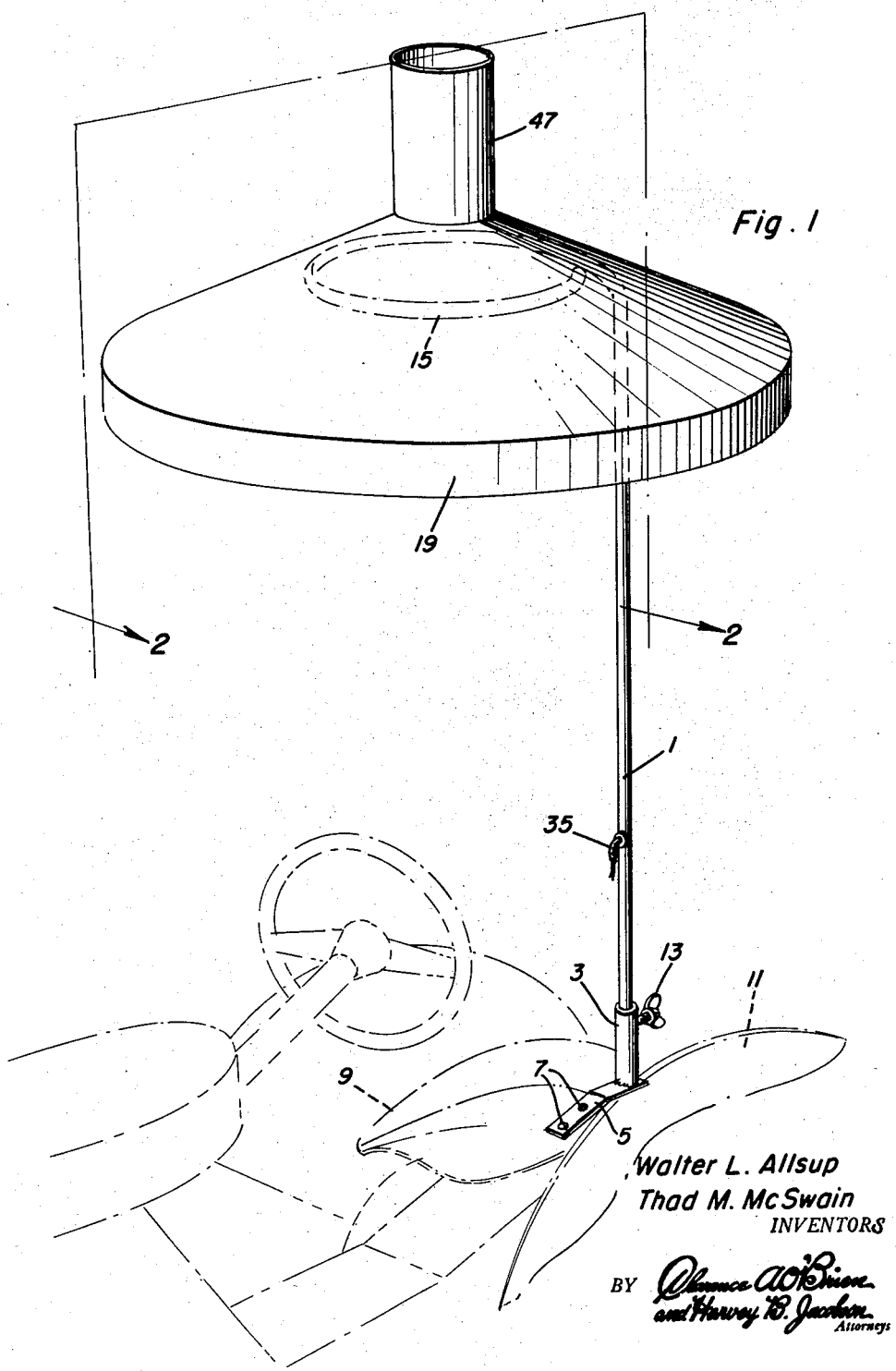
Figure 1 is a perspective view partly in broken lines of our invention in a preferred embodiment thereof.
Figures 2, 3:
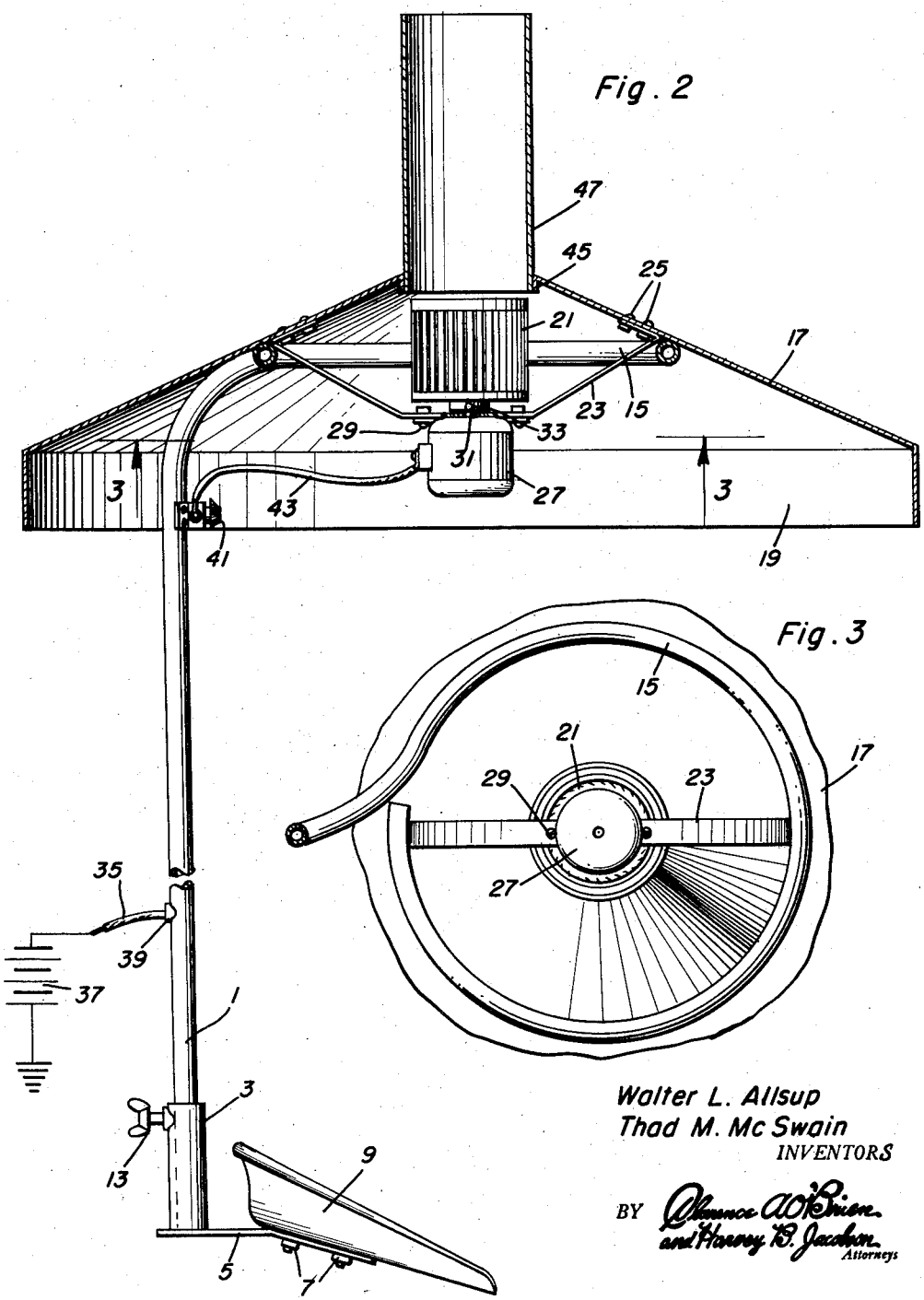
Figure 2 is an enlarged view in vertical section partly in side elevation and broken away and taken on the line 2—2 of Figure 1.
Figure 3 is an enlarged view in horizontal section taken on the line 3—3 of Figure 2.

Referring to the drawings by numerals the protecting device of our invention comprises a standard 1 of hollow tubing and any suitable metal seated at its lower end and rotatably and vertically adjustable in an upstanding socket 3 rising from an attaching bar 5 suitably bolted, as at 7, to the bottom of the operator's seat 9 of a tractor 11 so that the standard 1 rises in the rear of said seat. A set bolt 13 in the socket holds the standard in adjusted position. The standard 1 is provided at its upper end with a lateral, horizontal annular supporting frame 15 extending over the seat 9 and which is preferably bent from the standard 1.

An annular umbrella, or canopy, 17 of light metal such as aluminum rests on and surrounds the frame 15 and extends below the same. The umbrella, or canopy, is frusto-conical and provided with a depending edge skirt 19 for deflecting air downwardly in a column over an operator on the seat 9.

A suitable down draft fan 21 is suspended from the umbrella, or canopy, 17 coaxially thereof by a fan supporting V-shaped bar bracket 23 terminally bolted as at 25 to the umbrella, or canopy, and depending through the frame 15 to support the fan 21 coaxially thereof.

A conventional electric motor 27 depends from the fan below the bracket 23 and is bolted thereto, as at 29, with its armature shaft 31 extending through said bracket 21 and having the fan 23 bolted thereto as at 33. As will be seen the bracket 23 fits in the frame 15 to center itself and the described fan and motor unit in the frame 15 and the umbrella or canopy 17.

An electric cable 35 extends from the machine battery 37 into the standard 1 through a suitable guide 39 on the standard and from which said cable extends upwardly in the standard 1 to a suitable switch 41 thereon the switch 41 being connected to the motor 27 as by a cable 43.

The umbrella or canopy 17 is provided in its top with an axial opening formed by an internal annular flange 45 on said top above the fan 21 and an upstanding air downtake pipe 47 for the fan 21 is frictionally fitted in said flange and rises a substantial distance above the umbrella or canopy 11 so that said fan will draw air into the same from a point above the umbrella, or canopy 17, where the air is clear of dust or the like and is not subjected to heating by the umbrella or canopy when it becomes heated by sun rays.

The operation of our invention will be readily understood. The standard 1 is adjusted rotatably in the socket 3 to center the umbrella or canopy 17 over the operator's seat 9 and the switch 41 is closed to energize the motor 27 whereupon the fan 21 draws air downwardly through the pipe and blows the same outwardly under the umbrella or canopy 17 to be deflected thereby downwardly in a column toward the seat to maintain an operator on the seat cool and free from dust and insects. By detaching the cable 43 from the switch 41 or the motor 27 the umbrella or canopy can be lifted off the frame 15 and the motor 27, fan 21, bracket 23 and pipe 47 lifted therewith to detach these parts as a unit from the standard. The pipe 47 may then be detached so that it and the motor 27 and fan 21 assembled as a unit with the standard 1 when detached to form a compact bundle for storing or transporting. As will be apparent the weight of the motor 27 and fan 21 hold the umbrella or canopy 17 on the frame 15 when the ports are assembled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, a standard, means for attaching the standard to an operator's seat of an agricultural machine, a horizontal annular frame on the upper end of the standard, a frusto-conical canopy seated on said frame for directing air downwardly toward said seat, said canopy having an axial opening for passing air downwardly therethrough, a motor and fan unit in said canopy beneath said opening for drawing air downwardly through said opening and blowing such air outwardly in the canopy, and means for centering said canopy on said frame and said motor and fan unit beneath said opening comprising a V-bracket depending through said frame and fixed to said canopy, and having the motor depending from the center of the bracket with the fan carried above said bracket by said motor, said canopy and motor and fan unit and the bracket comprising a unitary removable and replaceable structure.

References Cited in the file of this patent
UNITED STATES PATENTS 2,627,217   Hainke et al. _____ Feb. 3, 1953
2,747,792   Bakke _____ May 29, 1956